United States Patent [19]

O'Donnell

[11] Patent Number: 4,886,069

[45] Date of Patent: Dec. 12, 1989

[54] METHOD OF, AND APPARATUS FOR, OBTAINING A PLURALITY OF DIFFERENT RETURN ENERGY IMAGING BEAMS RESPONSIVE TO A SINGLE EXCITATION EVENT

[75] Inventor: Matthew O'Donnell, Schenectady, N.Y.

[73] Assignee: General Electric Company, Schenectady, N.Y.

[21] Appl. No.: 135,198

[22] Filed: Dec. 21, 1987

[51] Int. Cl.[4] ............................................. A61B 8/00
[52] U.S. Cl. ................................. 128/661.01; 73/625; 367/103
[58] Field of Search ........................ 367/103, 121, 123; 73/620, 625–626; 128/661.01

[56] References Cited

U.S. PATENT DOCUMENTS

| | | | |
|---|---|---|---|
| 4,254,662 | 3/1981 | Kuroda et al. .......................... | 73/626 |
| 4,622,634 | 11/1986 | Fidel ..................................... | 73/626 X |
| 4,644,795 | 2/1987 | Augustine ............................. | 73/625 |
| 4,662,223 | 5/1987 | Riley et al. ............................ | 73/626 |

Primary Examiner—Francis Jaworski
Attorney, Agent, or Firm—Geoffrey H. Krauss; James C. Davis, Jr.; Marvin Snyder

[57] ABSTRACT

A method for receiving a return signal from each of plurality M of different beam directions in media excited by a single excitation event, is to: assign each of the M directions to be substantially equally separated, by a small angular displacement from a central beam; excite the media with a single energy beam transmitted to be focused at the central beam; receive a return signal from the central beam; and for each of the M different beam directions, independently rotating the phase of the received return signal by an amount predetermined to displace the apparent focus of the response beam to the associated direction.

21 Claims, 2 Drawing Sheets

METHOD OF, AND APPARATUS FOR, OBTAINING A PLURALITY OF DIFFERENT RETURN ENERGY IMAGING BEAMS RESPONSIVE TO A SINGLE EXCITATION EVENT

BACKGROUND OF THE INVENTION

The present invention relates to beamed energy imaging systems, such as an ultrasonic imaging system and the like, and, more particularly, to a novel method, and apparatus, for receiving a plurality M of different return signals, for real-time imaging and the like, from media excited by a single excitation event.

It is well known that, in energy-reflection imaging systems (such as ultrasound, sonar, radar and the like) utilizing energy beams for excitation of the medium to be imaged, contrast resolution can be limited by speckle noise and the like phenomena. It is also well known that the effects of speckle can be reduced if multiple images, each derived from a different data set each obtained with slightly different transmission conditions, are averaged. Unfortunately, the frame rate in real-time imaging is dramatically lowered, by a factor equal to the number of image data sets averaged, if data averaging is utilized to reduce speckle noise. Thus, it is not only desirable to maintain the imaging frame rate, even while allowing averaging of a plurality of signals, but also to increase the frame rate for any imaging application, such as real-time ultrasound blood flow imaging, which hitherto had to have a reduced frame rate due to the requirement for a plurality of different data sets from which to calculate the required display data. It is desirable to obtain these advantages by the simultaneous generation of multiple receive beams from each excitation event generating a transmission beam of energy incident upon the media to be investigated. By providing a plurality M of substantially simultaneous receive beams for each excitation beam transmitted, a combination of different image points per excitation and multiple frames-per-time-interval can be provided. However, the implementation of simultaneous multiple receive beams must, for cost-effective implementation in a phased array imaging system, use limited additional hardware (unlike the very hardware-intensive method proposed by Olaf von Ramm et al. at Duke University), and must also allow the multiple receive beams to be generated without requiring a complete new time delay schedule for each independent beam direction.

BRIEF SUMMARY OF THE INVENTION

In accordance with the invention, a novel method for substantially receiving a return signal from each of a plurality M of different beam directions in media excited by a single excitation event, is to: (a) assign each of the M beam directions to be substantially equally separated from a central beam by the same small angular displacement; (b) excite the media with a single energy beam transmitted to be focused at the central location; (c) receive a return signal from the central location; and (d) for each of the M different beam directions, independently rotating the phase of the received return signal by an amount predetermined to displace the apparent response beam to the associated separated direction.

In a presently preferred embodiment, M=2 and each channel of a phased array sector scanner (PASS) is provided with means for phase rotating the received signal by a displacement angle $\theta_d = \pm\Delta\theta/2$, where $\Delta\theta/2$ is the angular separation of each of the M=2 beams from the excitation beam centerline and is substantially equal to one-half of the normal separational angle between adjacent imaging beams transmitted from the PASS transducer array. For a PASS system with B beams produced per image frame, only B/M transmit beams, with separation angle $(M*\Delta\theta)$, need be fired in one frame. For example, a 90° sector scan with B=128 selectable beam angles normally has 128 image beams each separated by about 0.70° from the adjacent beams, but with M=2 requires only B/M=64 beams, each separated by $(90°*M)/B \approx 1.41°$, to obtain the same data. Presently preferred apparatus for providing the $\pm\Delta\phi$ phase rotation, for quadrature baseband digital data provided by a digital demodulator in each of a plurality of N channels (where N is the number of PASS array transducers), includes a pair of butterfly phase rotator means, each receiving the in-phase I and quadrature phase Q data signals, as well as data identifying the transmit beam angle $\theta_0$ then in use, for each providing one of the positively-displaced or negatively displaced reception beams.

Accordingly, it is an object of the present invention to provide a novel method, and apparatus, for substantially simultaneously obtaining a plurality of different reception beams responsive to a single excitation beam.

This and other objects of the present invention will become apparent upon reading the following detailed description of the invention, when considered in conjunction with the drawings.

DETAILED DESCRIPTION OF THE INVENTION

Figure 1:
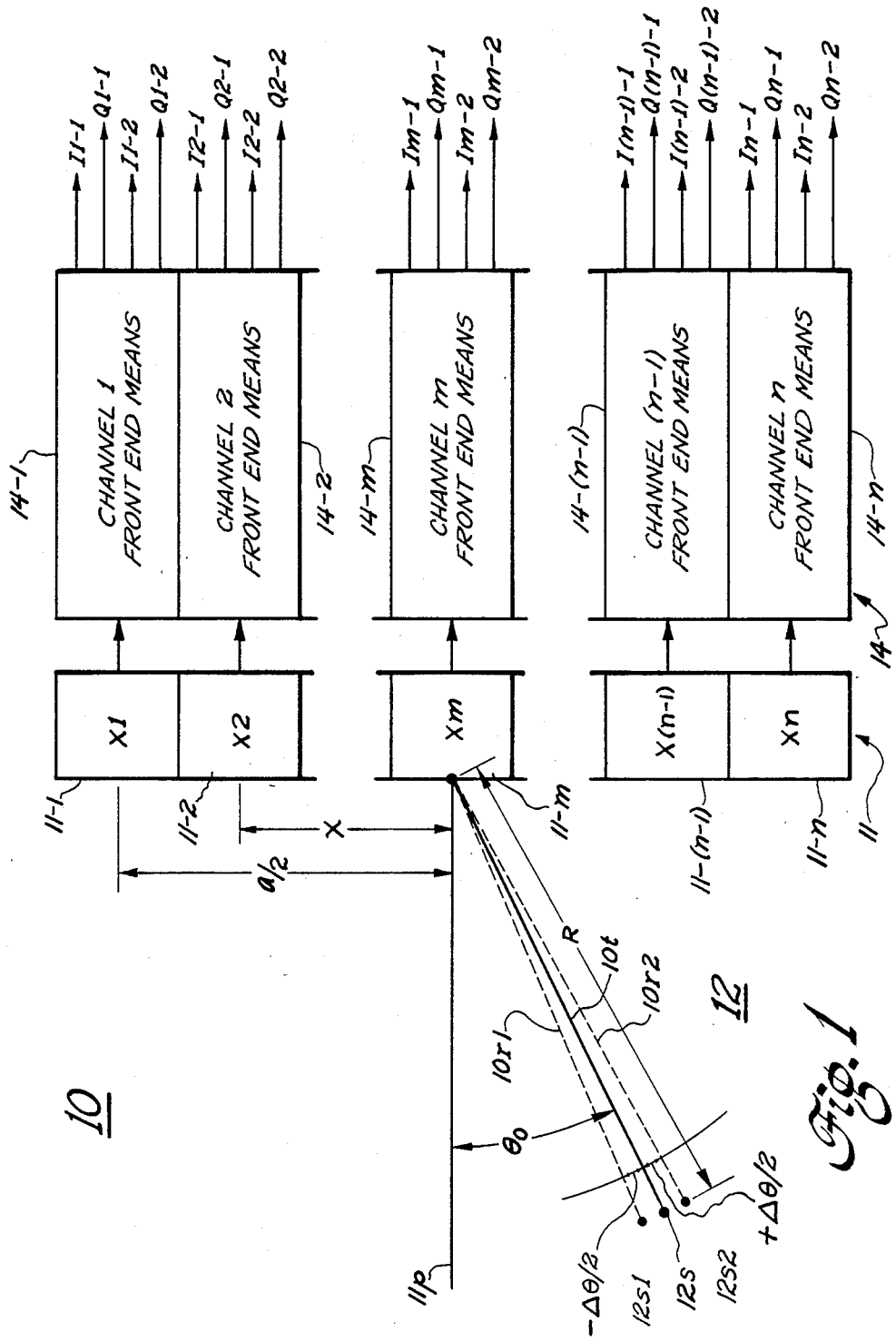
FIG. 1 is a schematic view of a phased array for generation of excitation and reception energy beams, and of a multiple channel imager front end for use therewith.

Referring initially to FIG. 1, a coherent imaging system 10 uses vibratory energy, such as ultrasonic waves, formed into an excitation beam 10t by a phased array 11 comprised of a plurality N of transducers X1-Xn. Each of the transducers 11 is individually energized, with timing criteria well known to the art, to form a single beam focused within media 12, at a particular range R and at an angle $\theta_0$ with respect to a line 11p normal to the transducer array surface. Normally, one reception beam is formed at angle $\theta_0$ and range R, to receive the energy reflected back to the array from any reflecting sample at the focus 12s of that particular beam.

In accordance with one principle of the present invention, a plurality M of different reception beams are substantially simultaneously produced, each angularly displaced by a displacement angular separation $\theta_d = \pm(2k-1)*\Delta\theta/2$, for $k=1,2,\ldots,M/2$ from the transmitted beam 10t. Thus, one excitation beam induces a return from M different beams in the sample, so that B/M excitation beams, each separated from adjacent beams by an angle $(M*\Delta\theta)$, are needed to produce a full sector image of B beams. The angle $\Delta\theta$ equals the typical angular separation between discrete adjacent beams of the sector scanner. Illustratively, M=2; a single excitation beam 10t illuminates sample point 12s and a pair of received beams 10r1 and 10r2, each directed at a small offset angle $\Delta\theta/2$ before and after the transmitted beam angle $\theta_0$, are simultaneously generated, to provide information for sample spots 12s1 and 12s2, to either side of the spot 12s and at essentially the same range R.

Figure 2:
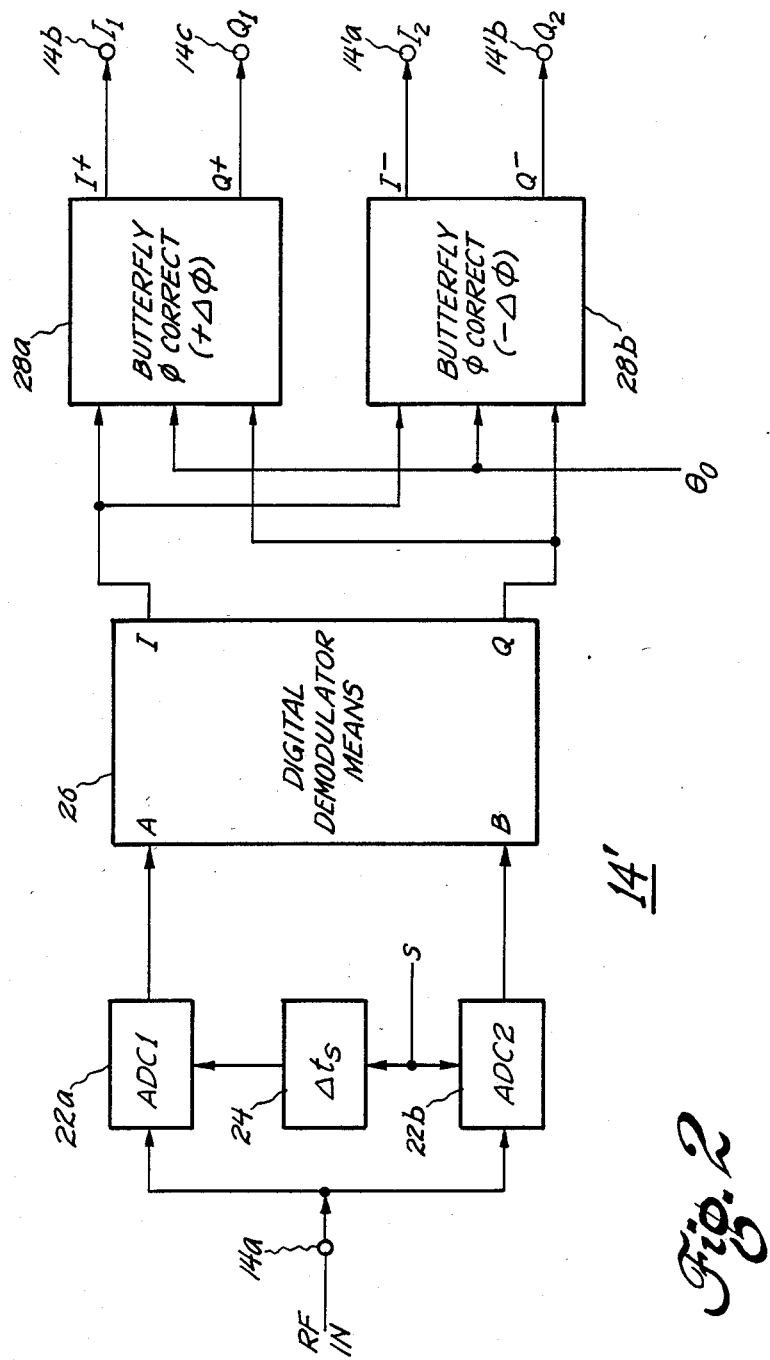
FIG. 2 is a schematic block diagram of the electronics forming a portion of each channel front end means, and illustrating the additional apparatus required for implementation of the method of the present invention.

The generation of a plurality M of simultaneous reception beams (for each excitation beam) is illustratively carried out in a high-speed digital phased array ultrasonic imaging system, as described and claimed in copending applications Ser. No. 944,482 (filed December 19, 1986) now U.S. 4,809,184, issued Feb. 28, 1989, and allowed Ser. No. 056,177 (filed June 1, 1987), both assigned to the assignee of the present application and incorporated herein in their entirety by reference. The phased array ultrasonic imaging system described in these applications utilizes a "front end" electronic means 14 having one channel of reception apparatus 14-$i$ for each transducer 11-$i$ of the array, where $1 \leq i \leq N$. Thus, means 14 has a like plurality N of channels, each with one of means 14-1 through 14-$n$ receiving the signal from an associated one of transducers 11-$l$ through 11-$n$, for converting the RF ultrasound return signal to at least one baseband digital signal. After time-gained-controlled amplification and the like, an RF IN signal is digitized by two analog-to-digital converter (ADC) means operating at a sampling frequency much higher than the maximum ultrasound RF frequency (e.g. at a sample frequency of about 20 MHz. for a 5 MHz. ultrasonic exertation system). As seen in FIG. 2, these prior-art ADC means 22a and 22b receive the RF IN signal at a node 14a, and receive respective sample signals S' and S. A sampling time delay $\Delta t_s$ means 24 appropriately phases the sample S' clock signal to ADC1 means 22a, with respect to the sample S clock signal to ADC2 means 22b, so that the sample output represents an RF signal beam focused at a target 12s at a given range R along a fixed beam direction $\theta_0$. The A and B digital data signals from respective ADC1 and ADC2 means 22a and 22b are received by a digital demodulation means 26 and are demodulated to provide a quadrature-phased pair of baseband signals comprising an in-phase I digital data signal and a quadrature-phase Q digital data signal. It will be seen that, if each new channel means 14' provides a plurality M (e.g. M=2) of quadrature-phased digital data signal pairs, with each signal of the pair emanating from a different location 12s$j$ (where $1 \leq j \leq M$) slightly displaced from central location 12s (such as the pair of digital data signals I1 and Q1 from a first location 12s$l$, with an angular displacement $=\Delta\theta/2$, with respect to the focal sample point 12s, and a second pair of quadrature-phased signals I2 and Q2 from another sample point 12s2, with an angular displacement $+\Delta\theta/2$, upon the opposite side of the single excitation beam along line 10t, at angle $\theta_0$ with respect to the array perpendicular 11p), then data is substantially simultaneously available from a plurality of different points within the media, so that it appears that a plurality M of different beams are simultaneously imaged by a single transmission beam. Therefore, data from the totality B of beams necessary for an image set can be received in an integer fraction 1/M of the time for one frame, so that it appears that the frame rate has been multiplied by the factor M; that is, only B/M excitation beams are needed, instead of B separate beams, for obtaining data from the entire object. It will be seen that, if the same frame rate is utilized, then the plurality M of reception beams for each excitation in one frame interval can allow a like plurality M of independent excitations of the media, with each excitation providing its own complete data set. Therefore, within the same frame time interval, a plurality M of full data sets becomes available, and can be averaged to reduce speckle noise in the resulting display.

In accordance with another aspect of the invention, simultaneous formation of a plurality M of separate receive beams, each displaced by an angular amount $\theta_d = \pm(2k-1) * \Delta\theta/2$, for $k=1,2,3,\ldots,M/2$, from the center axis of a single excitation beam, is provided by correcting the phase of each received signal by rotation through a phase $\Delta\phi$. For example, if M=2, than a pair of beams, each displaced in opposite direction from the transmit beam, are provided with k=1 and displacement angle $\theta_d = \pm\Delta\theta/2$. Phase $\Delta\phi$ has a magnitude responsive to the angular displacement increment $\Delta\theta$ of the imager. Thus, the RF response signal received by each transducer $X_i$ is sampled utilizing a ADC sample clock schedule appropriate for the center (excitation) beam 10t, at angle $\theta_0$. After demodulation to baseband, each of the in-phase I and quadrature-phase Q digital data signals is rotated through a phase correction angle of $+\Delta\phi$ to produce a first new pair of signals I1 and Q1 and is rotated through a second correction phase angle $-\Delta\phi$ to produce a new second pair of quadrature-phase signals I2 and Q2. Each set of signals represents one of the two received beams illustrated in FIG. 1; that is, data signals I1 and Q1 represent spot 12s2, and data signals I2 and Q2 represent spot 12S1. Each phase rotation is carried out by one of a pair of phase correction means 28, such as the butterfly phase rotation means illustrated in co-pending application Ser. No. 947,065, filed December 29, 1986, now U.S. 4,796,236, issued Jan. 3, 1989, assigned to the same assignee as the present application and incorporated herein in its entirety by reference. Each of the N channel means has a plurality M of butterfly digital phase rotators (here, each channel has the pair of phase correction means 28a and 28b); each rotating means comprises the four multipliers, pair of summation means and memory means shown as elements 23–30 in FIG. 2 of the above-mentioned application. Each phase correction means 28 receives the angle $\theta_0$ information as well as the I and Q data to provide phase corrected output signals I+ and Q+, from the $+\Delta\phi$ phase correction means 28a and outputs I— and Q— from the $-\Delta\phi$ phase correction means 28b. The resulting first pair of phase-corrected signals I1 and Q1 are provided at outputs 14b and 14c, with the second pair of phase corrected signals I2 and Q2 being provided at the respective channel means outputs 14'a and 14'b.

The magnitude of the phase rotation $\Delta\phi$, by which each of the I and Q data signals is corrected in each of means 28, depends upon the displacement angle $\Delta\theta$ chosen for a particular system. Illustratively, in a 90° sector scanning system, with $2^7 = 128$ different angles $\theta_0$, displacement angle $\Delta\theta$ can be selected as $(90°/128) \approx 0.70°$. The phase rotation $\Delta\phi$ magnitude changes with beam angle $\theta_0$ but does not change as a function of range R. Thus, the phase rotation $\Delta\phi$ for a channel having its transducer at an offset distance x (less than the maximum offset distance a/2, where a is the length of the aperture of array 11) is $$\Delta\phi(x,R,\theta_0) = \phi(x,R,\theta_0 + \Delta\theta/2) - \phi(x,R,\theta_0) \qquad (1)$$

which is $$\Delta\phi(x,R,\theta_0) = (2\pi/\lambda)``x(\sin\theta_0 - \sin(\theta_0 + \Delta\theta/2))$$
$$+ (x^2/2R)(\cos^2\theta_0 - 31\cos^2(\theta_0 + \Delta\theta/2))" \quad (1a)$$

and can be simplified to $$\Delta\phi(x,R,\theta_0) \sim (\pi/\lambda)`` - x\cos\theta_0$$
$$\Delta\theta - (x^2/R)\sin\theta_0\cos\theta_0\Delta\theta" \quad (1b)$$

The maximum phase difference value occurs: when displacement angle $\Delta\theta$ is maximum; for an array element is at the end of the aperture, i.e. transducer Xl or Xn with displacement distance $x = a/2$; and at a range R corresponding to the minimum f/number F of the array lens. The maximum angular displacement $\Delta\theta$, determined by the Nyquist condition for an aperture of length a, is $$\Delta\theta_{max} = \lambda/2a \quad (2)$$

so that the maximum phase difference at the end of the aperture is $$\Delta\phi(a/2, R_{min}, \theta_0) = -``\pi/4``"\cos\theta_0 + (\sin\theta_0\cos\theta_0/F_N)" \quad (3)$$

For an f/number $F = 2$ or greater, the maximum value of $\Delta\phi$ is about $\pi/4$ and the focusing contribution to this phase difference has a maximum value of about $\pi/16$. Consequently, a fixed rotation (as a function of range R) is a very good approximation for each of the two beams 10r1 and 10r2 generated by the pair of phase correction means 28a and 28b of apparatus 14′, which forms two separate receive beams on every repetition cycle. It will be seen that two independent excitation beams can therefore be transmitted at every beam angle, and the responses therefrom averaged, without a factor of two reduction in the overall frame rate of the imaging system.

In accordance with the present invention, this method of providing a plurality M of separate receiving beams for each excitation event can be utilized in speckle reduction by providing, in M cyclically alternating repetition intervals, a plurality M of different excitation beams, each with different spectral characteristics or focal properties. The averaging of the signals obtained with different excitations will result in a speckle noise reduction which can be as high as the factor of $\sqrt{M}$ in the image, without any loss in frame rate. If the M=2 circuit of FIG. 2 is employed, speckle noise can be reduced by a factor of $\sqrt{2}$.

In accordance with the present invention, another use of this method is in ultrasonic blood flow imaging where multiple excitation beams are transmitted at each beam angle to generate an estimation of the motion at each point along the beam. In this form of imaging, either the frame rate or the angular extent of the image sector would normally have to be reduced to accommodate the extra pulses needed on each beam line to estimate blood flow motion; therefore, use of my novel method for providing a plurality M of substantially simultaneous receive beams can increase either the frame rate or the angular extent of the image sector by a factor of M, e.g. a factor of 2 with the illustrated channel means configuration of FIG. 2.

Accordingly, the novel method, and apparatus, of the present invention can significantly improve the quality of at least two very important ultrasound medical imaging applications without a major increase in system cost; if each of the channel front end means 14 is provided in one or more VLSI integrated circuits, the relatively small circuit chip area required to implement the multipliers/summer/memory for M phase correction means 28 is easily added to each channel IC means.

While only certain preferred features of the present invention have shown by way of illustration, many modifications and changes will now occur to those skilled nn the art. For example, the method and apparatus of the present invention can be used with other beam-energy imaging modalities, such as radar, sonar and the like; a digital-beam forming phased-array radar system, for example, can use the phase-rotation method of the present invention instead of the relatively complicated Fourier transform methods currently practiced. It will be understood that the appended claims are intended to cover all such modifications and changes which fall within the true spirit and scope of the invention.

What I claim is:

1. A method for substantially simultaneously obtaining from media a plurality M of different return signals, each from a different beam, responsive to a single excitation event, comprising the steps of:
  (a) assigning each of the plurality M of beams to be substantially equally separated from a central beam by a small angular displacement;
  (b) exciting the media with a single beam of energy focussed along the central beam;
  (c) receiving a return signal responsive to the central beam;
  (d) separately demodulating to baseband that portion of the return signal in each of a plurality N of reception channels, each associated with a different one of an entire array of transducers utilized to form the single central beam; and
  (e) without additional time delay, independently rotating, prior to independent summation for generation of each of the plurality M of different beams, the phase of the demodulated baseband received return signal in each channel by an amount $\Delta\phi$ predetermined to displace the apparent origin of the return signal to a location along the associated one of the separated beams.

2. The method of claim 1, wherein step (e) includes the step of providing a phase rotation $\Delta\phi$ magnitude responsive to at least a preselected displacement angle $\Delta\theta$.

3. The method of claim 2, wherein a phased array sector scanner is used to transmit and receive signals, with a total of B beams obtainable over a scan sector of S degrees; and step (e) includes the step of selecting the magnitude of displacement angle $\Delta\theta$ to be substantially equal to (S/B) degrees.

4. The method of claim 3, wherein $S = 90°$, $B = 128$, $M = 2$ and $\Delta\theta \approx 0.70°$.

5. The method of claim 2, wherein each of the M beams is separated from a central beam angle $\theta_0$ by a different one of displacement angles $\theta_d = \pm(2k-1)*(\Delta\theta/2)$, where $k = 1, 2, \ldots, M/2$.

6. The method of claim 2, wherein $M = 2$, and step (d) includes the step of rotating the return signal by respective angles of $+\Delta\phi/2°$ and $-\Delta\phi/2°$ to respectively obtain the reception signal from respective first and second ones of the two separated locations.

7. The method of claim 2, wherein the excitation beam is transmitted by a transducer array; step (b) includes the step of focussing the excitation beam to a location at an angle $\theta_0$ with respect to a normal to the array; and step (e) includes the step of providing the phase rotation $\Delta\phi$ magnitude also responsive to the magnitude of the angle $\theta_0$.

8. The method of claim 7, wherein a plurality N of transducers form the array; and step (e) also includes the step of providing a different value of the phase rotation magnitude for that one channel associated with each transducer and responsive to an offset distance x of that transducer from the center of the array.

9. The method of claim 8, wherein step (e) also includes the step of providing the phase rotation $\Delta\phi$ magnitude also responsive to the range R of the central location from the center of the array.

10. The method of claim 9, wherein the phase rotation $\Delta\phi$ has a value approximately given by $$\Delta\phi \simeq (\pi/\lambda)(-x^*\cos\theta_0^*\Delta\theta - (x^2R)^*\sin\theta_0^*\Delta\theta).$$

11. A method of increasing the number of excitations of each of a totality B of different beam locations in a unit time interval, comprising the steps of:
 (a) dividing the unit time interval into a plurality M of cyclically repeating sequential frame intervals, where M is an integer greater than one;
 (b) selecting each of a plurality M of different beams from the totality B of independent beam directions and also substantially equally separated from a central beam direction by a small angular displacement;
 (c) exciting the media with a single beam of energy focussed at the central direction;
 (d) providing a plurality M of different reception signals, each responsive to energy reflected from an associated one of the plurality M of different directions and all responsive to the one beam of step (c), and including the substeps of; (d1) receiving a return signal responsive to the central beam; (d2) separately demodulating to baseband that portion of the return signal in each of a plurality N of reception channels, each associated with a different one of an entire array of transducers utilized to form the single central beam; (d3)without additional time delay, independently rotating, prior to independent summation for generation of each of the plurality M of different beams, the phase of the demodulated baseband received return signal in each channel by an amount $\Delta\phi$ predetermined to displace the apparent origin of the return signal to a location along the associated one of the separated beams;
 (e) repeating steps (b)–(d) for each of the remaining (B/M)−1 different sets of other pluralities M of beams in the totality of independent beam directions; and
 (f) repeating all of steps (b)–(e) for each of the (M−1) frame intervals in that unit time interval.

12. The method of claim 11, wherein step (f) includes the step of using the same M locations in each repetition of the same exciting beam.

13. The method of claim 11, further including the step of averaging the reception signals, obtained in all M frame intervals of the same unit time interval, from at least one selected media location.

14. The method of claim 13, including the step of obtaining an averaged reception signal from each of substantially all of the totality of media locations in each unit time interval.

15. The method of claim 11, wherein step (f) includes the step of using all M frame intervals for at least one of Doppler processing and blood flow imaging.

16. Apparatus for obtaining a plurality M of substantially simultaneous different return signals, each from a different beam direction all substantially equally separated from a central location, responsive to a single RF return signal from that central location due to a single excitation event, comprising:
 means for converting the RF return signal to a baseband signal; and
 means, devoid of means for providing additional time delay to the baseband signal, for independently rotating the phase of each of M duplicates of the baseband signal by an amount $\Delta\phi$ predetermined to displace the apparent origin of each phase-rotated baseband signal to the associated one of the separated independent beam directions.

17. The apparatus of claim 16, wherein M=2, a pair of identical baseband signals are provided to said rotating means, and said rotating means includes: means for rotating a first baseband signal by $+\Delta\phi$ to provide a first output signal corresponding to the signal received from a first media location; and means for rotating a second baseband signal by $-\Delta\phi$ to provide a second output signal corresponding to the signal received from a second media location.

18. The apparatus of claim 16, wherein the plurality M of beam directions are all separated from the central location by a substantially equal displacement angle proportional to an angle $\theta_d = \pm(2k-1)^*\Delta\theta$, for $k=1,2,\ldots,M/2$; and the phase rotation of said rotating means is responsive to the magnitude of angle $\Delta\theta$.

19. The apparatus of claim 18, wherein the excitation event results in an energy beam transmitted at an angle $\theta_0$ from a normal to a surface of an originating transducer array, and the phase rotation of said rotating means is also responsive to the magnitude of angle $\theta_0$.

20. The apparatus of claim 19, wherein the array comprises a plurality N of transducers, each located at a different distance x from the center of the array; each transducer has channel signal means associated therewith and including one of a like plurality N of converting means and one of a like plurality of phase-rotating means; and the phase rotation of the rotating means in the signal means of that channel is also responsive to the magnitude of the offset distance for the transducer associated with that channel.

21. The apparatus of claim 20, wherein the central location is at a range R from the array, and the rotating means applies a value of phase rotation $\Delta\phi$ approximately given by $$\Delta\phi \simeq (\pi/\lambda)(-x^*\cos\theta_0)^*\Delta\theta - (x^2/R)^*\sin\theta_0 {}^*\cos\theta_0^*\Delta\theta.$$

* * * * *